US011262016B2

(12) United States Patent
Stangeland et al.

(10) Patent No.: US 11,262,016 B2
(45) Date of Patent: Mar. 1, 2022

(54) SUBSEA PIG LAUNCHERS

(71) Applicant: Subsea 7 Norway AS, Stavanger (NO)

(72) Inventors: Oivind Stangeland, Sandnes (NO);
Karl Erik Suphellen, Algard (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 16/643,344

(22) PCT Filed: Aug. 30, 2018

(86) PCT No.: PCT/EP2018/073378
§ 371 (c)(1),
(2) Date: Feb. 28, 2020

(87) PCT Pub. No.: WO2019/043113
PCT Pub. Date: Mar. 7, 2019

(65) Prior Publication Data
US 2020/0347980 A1    Nov. 5, 2020

(30) Foreign Application Priority Data
Aug. 31, 2017 (GB) ..................... 1713991

(51) Int. Cl.
*F16L 55/46* (2006.01)
*B08B 9/055* (2006.01)
*F16L 101/12* (2006.01)
*F16L 55/38* (2006.01)
*F16L 101/30* (2006.01)

(52) U.S. Cl.
CPC ............ *F16L 55/46* (2013.01); *B08B 9/0553* (2013.01); *B08B 9/0557* (2013.01); *F16L 55/38* (2013.01); *F16L 2101/12* (2013.01); *F16L 2101/30* (2013.01)

(58) Field of Classification Search
CPC ....... F16L 55/46; F16L 55/38; F16L 2101/12; F16L 2101/30; B08B 9/0553; B08B 9/0557; B08B 9/055
USPC ...................... 15/104.062, 104.061, 104.063
See application file for complete search history.

(56) References Cited

U.S. PATENT DOCUMENTS

| | | |
|---|---|---|
| 3,322,140 A | 5/1967 | Scott |
| 4,052,090 A | 10/1977 | Stafford |
| 4,183,559 A | 1/1980 | Stafford et al. |
| 6,022,421 A | 2/2000 | Bath et al. |

(Continued)

FOREIGN PATENT DOCUMENTS

| | | | | |
|---|---|---|---|---|
| GB | 2446603 A | * | 8/2008 | ............... F28G 1/12 |
| GB | 2469058 | | 10/2010 | |

(Continued)

*Primary Examiner* — Michael D Jennings
*Assistant Examiner* — Makena S Markman
(74) *Attorney, Agent, or Firm* — Levy & Grandinetti (57) ABSTRACT

A compact subsea pig launcher comprises a tubular magazine for holding a plurality of pipeline pigs in longitudinal succession ready for launching successively into a subsea pipeline. The magazine is shaped to define at least one turn such as a coil around an upright axis. Thus, a series of pigs are stored in longitudinal succession along a path that is curved in plan view around the upright axis. During launching, at least one of the series of pigs is advanced along the path with angular movement around the upright axis.

30 Claims, 7 Drawing Sheets

(56) References Cited

U.S. PATENT DOCUMENTS

| | | | |
|---|---|---|---|
| 6,428,241 B1* | 8/2002 | Stracke | F16L 55/46 405/184.1 |
| 6,533,032 B1 | 3/2003 | Seixas et al. | |
| 6,596,089 B2 | 7/2003 | Smith et al. | |
| 8,296,894 B2 | 10/2012 | Watson et al. | |
| 8,550,171 B2* | 10/2013 | Wajnikonis | E21B 17/017 166/355 |
| 8,752,229 B2* | 6/2014 | Archer | F16L 55/46 15/104.062 |
| 8,800,587 B2 | 8/2014 | Breuer et al. | |
| 9,027,191 B2* | 5/2015 | Tyrrell | F16L 55/46 15/104.062 |
| 2002/0170599 A1* | 11/2002 | Disher | B08B 9/055 137/269 |
| 2005/0184083 A1* | 8/2005 | Diaz | E21B 33/138 221/75 |
| 2007/0258868 A1* | 11/2007 | Adams | B01J 19/0026 422/131 |
| 2010/0195783 A1* | 8/2010 | Kwon | B08B 9/055 376/310 |
| 2012/0216899 A1* | 8/2012 | Broussard | B01F 5/061 137/896 |
| 2015/0315301 A1* | 11/2015 | Adams | B01J 19/1837 526/64 |
| 2018/0031146 A1* | 2/2018 | Pinho | F16L 1/161 |

FOREIGN PATENT DOCUMENTS

| | | |
|---|---|---|
| GB | 2497701 | 6/2013 |
| KR | 10-1370132 | 3/2014 |
| KR | 2015-0086639 | 7/2015 |
| WO | WO 2011/145946 | 11/2011 |
| WO | WO 2012/058551 | 5/2012 |

* cited by examiner

SUBSEA PIG LAUNCHERS

This invention relates to subsea pig launchers. In particular, the invention relates to the challenges of storing and launching multiple pigs used for maintenance, inspection or other operations performed on a subsea pipeline.

Oil and gas pipelines transport multiphase fluids that tend to leave solid deposits on the tubular internal wall of the pipeline. Such deposits may comprise sand, muds, hydrates, waxes and/or condensates of asphaltene. As they thicken over time, these deposits can restrict fluid flow along the pipeline and may even, eventually, block it. A subsea pipeline blockage can of course be extremely disruptive; remedying it can be very complex and expensive.

As a subsea pipeline typically has a working life of about twenty years, it is necessary to clean deposits from the bore of the pipeline from time to time. A common way of doing so is pigging, that is, to propel a pig along the pipeline. Pigs may also be used for flushing, dewatering, pressure-testing or inspecting a pipeline from within.

Pigs may have various shapes of circular cross-section, such as spheres, cylinders or dumbbells. Their outer diameter is selected to be substantially equal to the inner diameter of the pipeline in question. Thus, a pig is a close sliding or interference fit within and against the interior of the pipeline.

In use, pigs are injected into and propelled along a pipeline by fluid pressure. Specifically, a pressure differential is created within the pipeline between a volume ahead of the pig and a volume behind the pig, with respect to the intended direction of travel. Thus, a pig is driven along a pipeline from a pig launcher, or trap, to a pig receiver by a pressure differential in the pipeline between upstream and downstream sides of the pig.

To maintain the necessary pressure differential, a pig has a series of annular or disc-shaped circumferential seals that separate the volume within the pipeline ahead of the pig from the volume within the pipeline behind the pig. The seals are suitably stiff enough to provide a scraping action so as to clean and flush the interior of the pipeline as the pig moves along the pipeline.

Bi-directional pigs can be shuttled along a pipeline in opposed reciprocal directions. Such pigs therefore have seals that are arranged to maintain adequate sealing contact with the interior of a pipeline irrespective of the direction of travel of the pig along the pipeline.

Most conveniently, the desired pressure differential is created by introducing high-pressure fluid through a pressure inlet into a volume behind the pig, initially within a pig launcher and then, after injection, within the pipeline. Thus, a pig launcher propels pigs into and along a pipeline with the relevant pressure differential.

A pig launcher comprises a section of pipe or tubing defining a chamber for housing one or more pigs. That chamber is supplied with high-pressure fluid through pressure inlets controlled by valves, connected to one or more pressurising lines known in the art as 'kick lines'. The chamber communicates with the interior of the pipeline through an access opening that is normally disposed at an end of the pipeline but, in principle, could be anywhere along the length of the pipeline.

Where there is only one pig, a pig launcher must be reloaded with another pig after each pig is launched. This requires repeatedly opening an end cap of the pig launcher, which may contain pressurised fluid, and so is impractical for subsea use. For this reason, it is desirable for a subsea pig launcher to contain two or more pigs and to make provision for those pigs to be launched successively and separately into and along a pipeline when required. In particular, multiple kick lines may be provided to launch the pigs successively when required.

It is impractical to leave a pig launcher in situ underwater for the full working life of a subsea pipeline. Thus, pig launchers are removed from a pipeline periodically to enable them to be reloaded and maintained and then to be reinstalled or re-used elsewhere.

Removing and reinstalling a subsea pig launcher is potentially complicated, time-consuming and therefore expensive as it requires the support of lifting vessels and intervention by divers or remotely-operated vehicles (ROVs). It is therefore desirable for a subsea pig launcher to contain as many pigs as possible.

The state of the art of subsea multiple pig launchers is to house several pigs in a horizontal or vertical tube, ready to be launched. Features are also provided to facilitate removal and reinstallation of the unit.

Examples of vertical multiple pig launchers are disclosed in U.S. Pat. Nos. 6,022,421 and 6,428,241. For instance, the multiple pig launcher of U.S. Pat. No. 6,022,421 comprises a vertical pipe section that holds a succession or train of pigs in series and is supplied with high-pressure fluid through various valves and pressure inlets.

U.S. Pat. No. 6,596,089 teaches a way of reloading a pig launcher subsea by coupling it to a rack carried by an ROV.

As an alternative, U.S. Pat. No. 8,800,587, US 2002/0170599 and U.S. Pat. No. 6,533,032 disclose vertical multiple pig launchers that comprise multiple storage barrels mounted in parallel. Once a barrel has been emptied of pigs, it is replaced by a loaded barrel. However, the multi-barrel system makes it complex to manage changes between barrels while ensuring sufficient water-tightness.

U.S. Pat. No. 8,296,894 shows that systems for pressurising and launching pigs are more complex in a horizontal multiple pig launcher. Vertical pig launchers are preferred because gravity simplifies launching. Thus, releasing a latch or opening a valve frees the first pig, which can then run into the pipeline with minimal extra pressure.

In GB 2497701, pigs are stored in a magazine between a piston and a spring that aligns the next pig with the pipeline. The magazine is transverse to the pipeline and therefore may require a large support structure.

Pig launchers may be obviated by a closed pigging loop, as exemplified by KR 20150086639. However this requires an injection and retrieval zone because the loop itself is not retrievable to the surface. A further drawback of a closed loop is that numerous pressure injection and relief lines are necessary to drive the pigs.

U.S. Pat. No. 8,752,229 describes a compact pig launcher for multiple pigs. It teaches arranging the storage magazine as a curve in a vertical plane. A vertical plane is selected for simplifying vertical connection to the pipeline. A drawback of this layout is the need for extra pressure to propel a pig upwards into the magazine before launching it.

Against this background, the present invention resides in a subsea pig launcher comprising a tubular magazine for holding a plurality of pipeline pigs in longitudinal succession ready for launching successively into a subsea pipeline, wherein the magazine is shaped to define at least one turn around an upright axis.

Preferably, the or each turn of the magazine completes a full or partial loop. There may be a succession of intercommunicating loops stacked or layered along the upright axis. The successive loops may have substantially the same size or shape as each other and may define a generally helical arrangement of successive coils.

Elegantly, a substantially cylindrical lumen extending along the upright axis within the succession of loops may house a launch system that communicates with the magazine to launch the pigs. The launch system may comprise a plurality of kick lines each communicating with a respective loop. The kick lines are conveniently pressurised by a common line extending within and along the succession of loops.

The magazine may be shaped to define an inner turn within an outer turn, for example as inner and outer inter-communicating loops. In another approach, successive turns may be in mutually-opposed directions, such as clockwise and anticlockwise with respect to the upright axis. In this way, the magazine could be shaped to define intercommunicating loops that lie beside each other in a plane intersecting the upright axis.

At least one turn may be curved along its length with a substantially constant radius of curvature, with a variable radius of curvature or with discontinuous curvature. For example, a turn may have at least one substantially straight section and at least one bend. In this case, the magazine may have a substantially polygonal shape in top plan view.

The pig launcher of the invention is apt to be supported in a frame as part of a subsea-connectable module. The frame may be substantially cuboidal, in which case a substantially straight section of the magazine preferably lies substantially parallel to a generally flat side face of the cuboidal frame. Thus, where the magazine has a substantially polygonal or part-polygonal shape in plan view, at least one side of that shape preferably lies substantially parallel to a face of the frame.

The frame may have a height greater than its width. Also, the frame may comprise at least one upright guide formation that preferably extends in a direction substantially parallel to the upright axis.

The inventive concept extends to a corresponding method of launching pipeline pigs subsea. That method comprises: providing a series of pigs stored in longitudinal succession along a path that is curved in plan view around an upright axis; and advancing at least one of the series of pigs along the path with angular movement around the upright axis. Preferably, at least one of the series of pigs is advanced at least 360° around the upright axis.

Conveniently, launch pressure may be applied to the pigs from an inner side of the curve of the path.

A modular structure that supports the pigs is preferably moved in a direction of movement substantially parallel to the upright axis during installation and removal operations.

In summary, embodiments of the invention provide a subsea pig launcher for launching at least two pigs into a pipeline without reloading. The pig launcher comprises a storage magazine in fluid communication with the pipeline, which magazine may for example contain at least ten pigs, and at least one pressurised fluid line for propelling the pigs into the pipeline. The storage magazine is shaped to define at least one turn around an upright axis, preferably a vertical axis. The or each turn may complete a full or partial loop. Preferably at least one turn completes a full loop, and more preferably a succession of loops along the upright axis.

Preferably the magazine has a storage portion that communicates with an exit tube. The storage portion comprises the at least one turn around the upright axis, whereas the exit tube need not have such a turn. The exit tube may, for example, extend along an axis that, when projected, intersects a plane containing a turn.

A turn may have various shapes. For example, a turn may be curved or bent along its length continuously with a substantially constant radius of curvature, such as substantially circular or part-circular, or with a variable radius of curvature such as elliptical or part-elliptical.

Curvature of a turn may instead be discontinuous, for example having at least one straight section and at least one bend, such as a regular or irregular polygon with rounded corners. Thus, a turn may, for example, be substantially rectangular, hexagonal or octagonal. Generally polygonal shapes with slightly curved or rounded sides and corners are also possible. References to a polygon or polygonal may include part of a polygon or part-polygonal.

To avoid jamming a pig, the radius of curvature of any section of a turn is preferably more than three times the diameter of a tube that defines the storage magazine.

Preferably there are successive or continuous turns, which may be stacked or layered along an upright axis, for example as a coil, and/or may be concentric or nested, for example as a spiral. Successive turns preferably have substantially the same size or shape as each other but they could have different sizes or shapes.

An internal bore of the storage magazine suitably has a downwards slope toward the connection with the pipeline, for example in an exit tube. Conveniently, this allows gravity to reduce the pressure differential needed to displace a pig before it is injected into the pipeline.

The pig launcher suitably comprises a support frame and is advantageously retrievable to the surface. Thus, the pig launcher is suitably connected to the pipeline by a subsea-disconnectable connector.

The invention therefore provides an automated pig launcher in which a pig storage pipe or magazine is not a straight pipe but may, in preferred embodiments, be looped or coiled around an upright axis. This enables the pig launcher to store a large number of pigs within a compact envelope suitable for being lowered in modular fashion into engagement with a subsea host unit or installation. For example, a pig launcher of the invention may contain about 100 wax-removal pigs of 12″ (305 mm) diameter.

The loop or coil can consist of continuously-curved pipe, a series of pipe bends, or pipe bends and straight segments in combination. Pipe bends may, for example, extend through 45°, 60°, 90° or 180°.

The invention beneficially increases the time required between replacements or refills of a pig magazine. In subsea applications, this results in a substantial reduction in vessel operations and hence a very large cost saving.

In order that the invention may be more readily understood, reference will now be made, by way of example, to the accompanying drawings in which.

Figure 1:
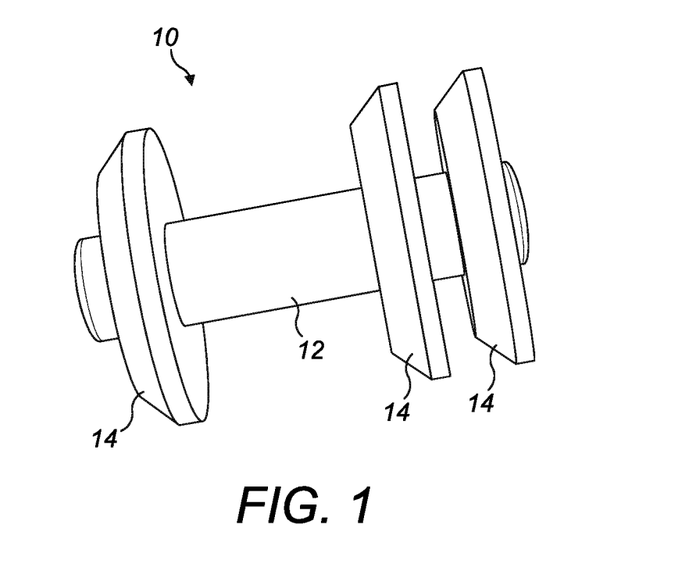
FIG. 1 is a perspective view of a subsea pig that is apt to be used in a pig launcher of the invention.

Referring firstly to FIG. 1, this shows a subsea pig 10 that is apt to be used in a pig launcher of the invention. In general, the pig 10 is of conventional dumbbell configuration, comprising a central longitudinal shaft 12 that supports a series of longitudinally-spaced disc-shaped sealing plates 14. The sealing plates 14 are of circular cross-section and are dimensioned to fit closely within the bore of a pipeline that is equipped with the pig launcher.

Figure 2:
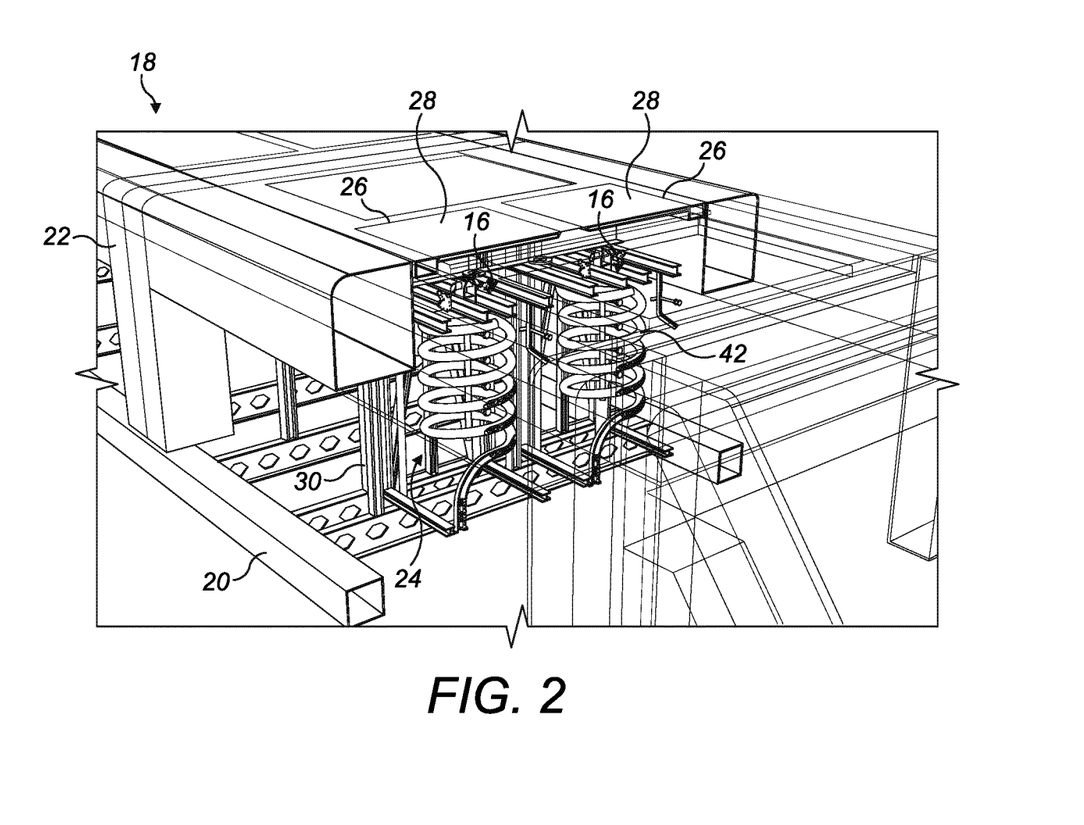
FIG. 2 is a cutaway perspective view of subsea apparatus fitted with a pair of pig launchers of the invention.

FIG. 2 shows a pair of pig launchers 16 of the invention, fitted to a subsea unit 18 that will be coupled to a pipeline on the seabed as part of a subsea oil and gas installation. Two pig launchers 16 as shown here provide failsafe redundancy and also provide additional pig capacity. However, in principle, either of the pig launchers 16 could be used individually.

The subsea unit 18 comprises a structural frame 20 that supports a smoothly-contoured housing 22. Within the housing 22, the frame 20 also supports various items of equipment other than the pig launchers 16. However, those other items of equipment have been omitted from this view for clarity.

The structural frame 20 of the subsea unit 18 defines various individual silos or bays 24 for the items of equipment that it supports. Each bay 24 opens to a respective access opening 26 on the top of the unit 18, which is substantially horizontal. This allows items of equipment to be lowered from the surface into the unit 18 for installation and to be lifted from the unit 18 for recovery to the surface. Normally the access openings 26 are closed by hatches 28 to maintain the continuity of the housing 22 except during installation or recovery operations.

Each bay 24 of the subsea unit 18 is defined by uprights 30 that surround the bay 24. The uprights 30 serve as rails to define an insertion path aligned with the access opening 26 above.

Figure 3:
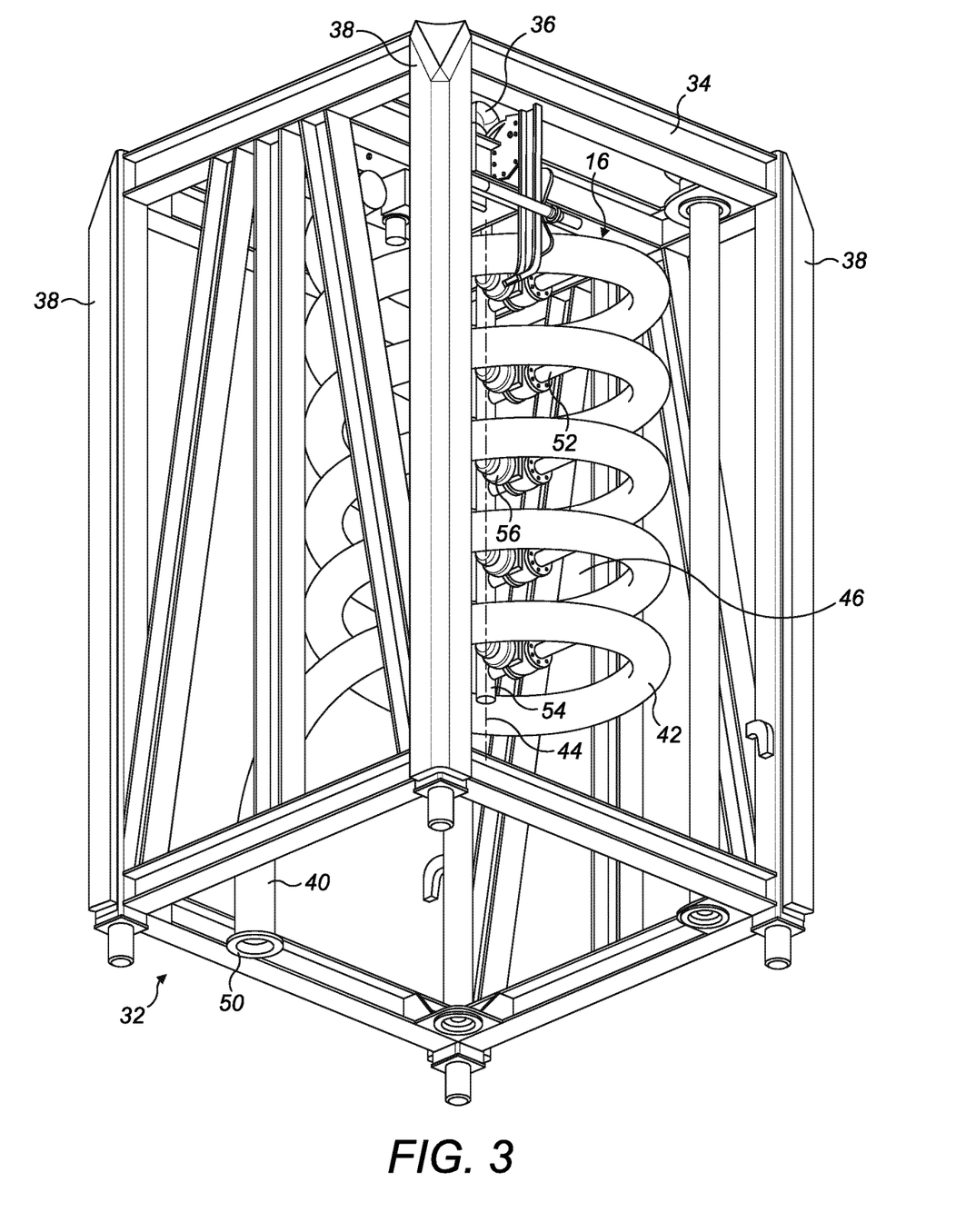
FIG. 3 is a perspective view from underneath of one of the pig launchers shown in FIG. 2.
Figure 4:
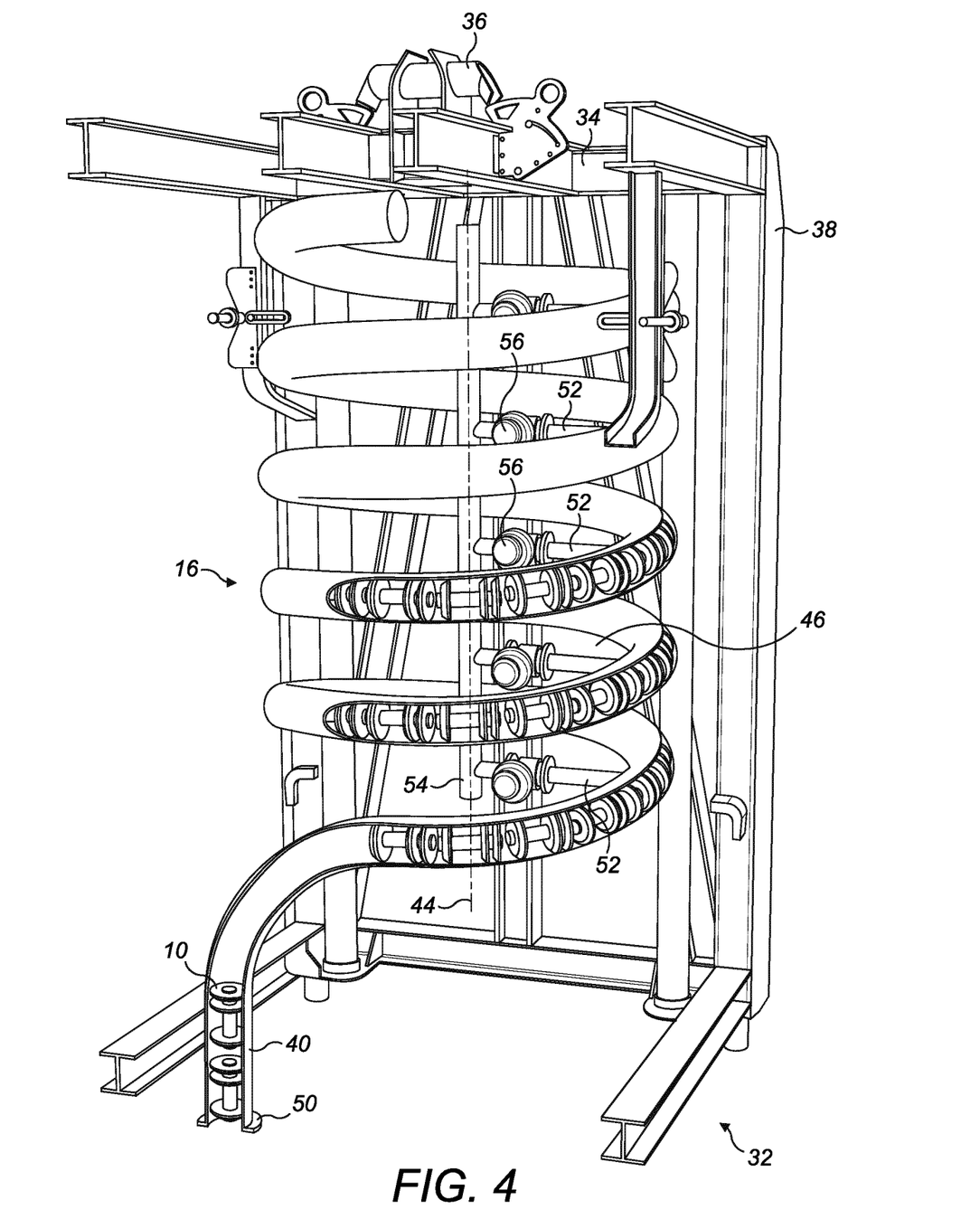
FIG. 4 is a cutaway perspective view of the pig launcher shown in FIG. 3.

Reference is now made additionally to FIGS. 3 and 4 of the drawings. These drawings show that each pig launcher 16 is supported in a respective drop-in module 32 by a module frame 34. For this purpose, the frame 34 has lifting points 36 on its upper cross-members. The frame 34 also has upright parallel guides 38 that align with and slide along the complementary uprights 30 of the appropriate bay 24, hence to direct the module 32 into the bay 24 along the insertion path.

By way of example, the module 32 may be about 6.5 m high in side view and about 4 m square in plan view.

Beneficially, inserting a module 34 into its associated bay 24 aligns the pig launcher 16 within the module 34 with the pipeline. This enables a downwardly-opening exit tube 40 of a magazine 42 in the pig launcher 16 to be coupled releasably to the pipeline for launching pigs into the pipeline as required. In this respect, the pipeline will extend substantially horizontally at a level beneath the pipe launcher 16, lying on or parallel to the surrounding seabed.

It will be apparent that the top-loading modular arrangement described above imposes certain constraints upon the shape of the module 34 so as to make best use of the space within the subsea unit 18. Notably, the module 34 is generally cuboidal and is substantially taller than it is wide. This also imposes constraints upon the shape and size of the equipment supported by the module 34, in this case a pig launcher 16.

The magazine 42 comprises a continuous elongate tubular element for holding a linear succession or train of pigs 10 like those shown in FIG. 1. The tubular element of the magazine 42 is itself coiled helically around an upright central longitudinal axis 44 to form a tubular overall shape that surrounds a central cylindrical longitudinally-extending lumen 46. Each loop or coil of the helix is acutely inclined relative to the central longitudinal axis 44 to lead to, and to accommodate, the next loop or coil in longitudinal succession.

The central longitudinal axis 44 that extends along the helix of the magazine 42 is substantially parallel to the guides 38 that extend along vertical edges of the module frame 34. Thus, the axis 44 is itself substantially vertical.

The central longitudinal axis 44 is also an axis of curvature of the coils of the helix, which are substantially circular in horizontal cross section. Thus, each loop or coil of the helix is curved continuously in a circumferential direction along its length.

The coiled tubular element defining the magazine 42 has a closed upper end 48 and an open lower end that curves smoothly into the exit tube 40. The exit tube 40 terminates at its bottom end in a flange coupling 50 for a subsea-releasable connector element (not shown). Such a connector element is cooperable with a complementary connector element upon installing the module 34 so as to couple the magazine 42 with a pipeline.

In this example, the lower end of the exit tube 40 faces downwardly so that coupling with a pipeline may be effected, conveniently, by inserting the module 34 downwardly into its bay 24 of the subsea unit 18. In other examples, the end of the exit tube 40 may face horizontally or at any inclination between horizontal and vertical, for example to connect to an inclined wye structure.

A vertical array of kick lines 52 communicates with the magazine 42 at vertically-spaced intervals to launch pigs 10 selectively in succession through the exit tube 40, in conventional manner. Elegantly, though, the kick lines 52 are accommodated compactly within the lumen 46 of the helical coil. Also, all of the kick lines 52 are supplied with high-pressure fluid through a common pressure rail 54 that extends longitudinally along the lumen 46. There is one kick line 52 for each coil of the helix. Flow of the high-pressure fluid through each kick line 52 is controlled by a respective valve 56 in the kick line 52 between the pressure rail 54 and the coil of the magazine 42.

Turning next to FIGS. 5 to 8, these schematic drawings show that a loop or coil of a magazine can have various cross-sectional shapes, in plan, other than circles. Incorporating one or more straight, or relatively straight, lengths of the continuous tube that forms the magazine may help to accommodate a greater overall length of that tube within the cuboidal confines of the supporting module 34. For example, straight portions of the tube can lie compactly within, and substantially parallel to, straight or flat sections of the plan envelope or periphery of the module 34. This maximises the number of pigs 10 that can be accommodated in the pig launcher 16.

Figure 5:
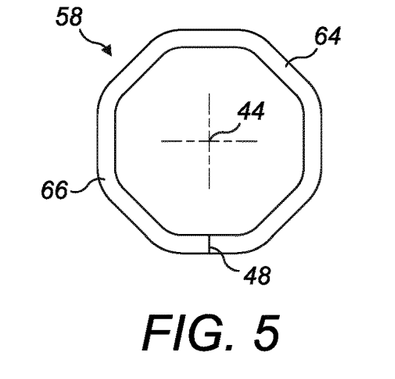
FIGS. 5 to 8 are schematic plan views showing various loop shapes that may be used for magazines of variant pig launchers of the invention.
Figure 6:
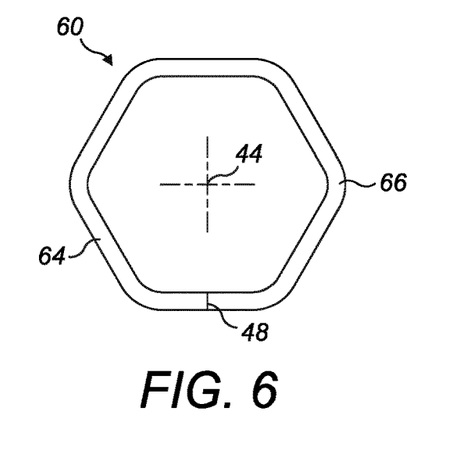
Figure 7:
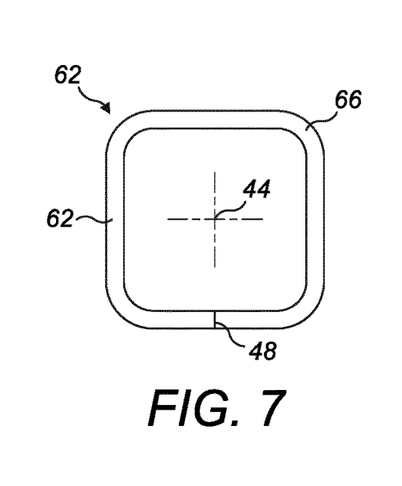

FIGS. 5, 6 and 7 show generally polygonal loop configurations for magazines 58, 60, 62 respectively, in which straight portions 64 alternate with corners or bends 66 when moving around each loop. Put another way, portions of greater and lesser curvature alternate with each other around each loop.

Each loop shown in FIGS. 5, 6 and 7 may of course repeat as a continuous spiral or stack extending longitudinally along the central longitudinal axis 44, like the helix shown in FIGS. 2 to 4. The closed upper end 48 of a tube forming the magazine 58, 60, 62 is shown in each case.

In the examples shown in FIGS. 5, 6 and 7, the polygonal shapes are not geometrically exact because the corners of the polygon are rounded or radiused to facilitate smooth passage of the pigs 10 within the magazines 58, 60, 62. Specifically, the radius of curvature of each corner or bend 66 should be more than three times the diameter of the tube that forms the magazine 42. However, it will be evident that the underlying polygonal shapes of the magazines 58, 60, 62 in FIGS. 5, 6 and 7 are, respectively, an octagon, a hexagon and a square. Thus, the bends 66 in these figures extend, respectively, through 45°, 60° and 90°.

Figure 12:
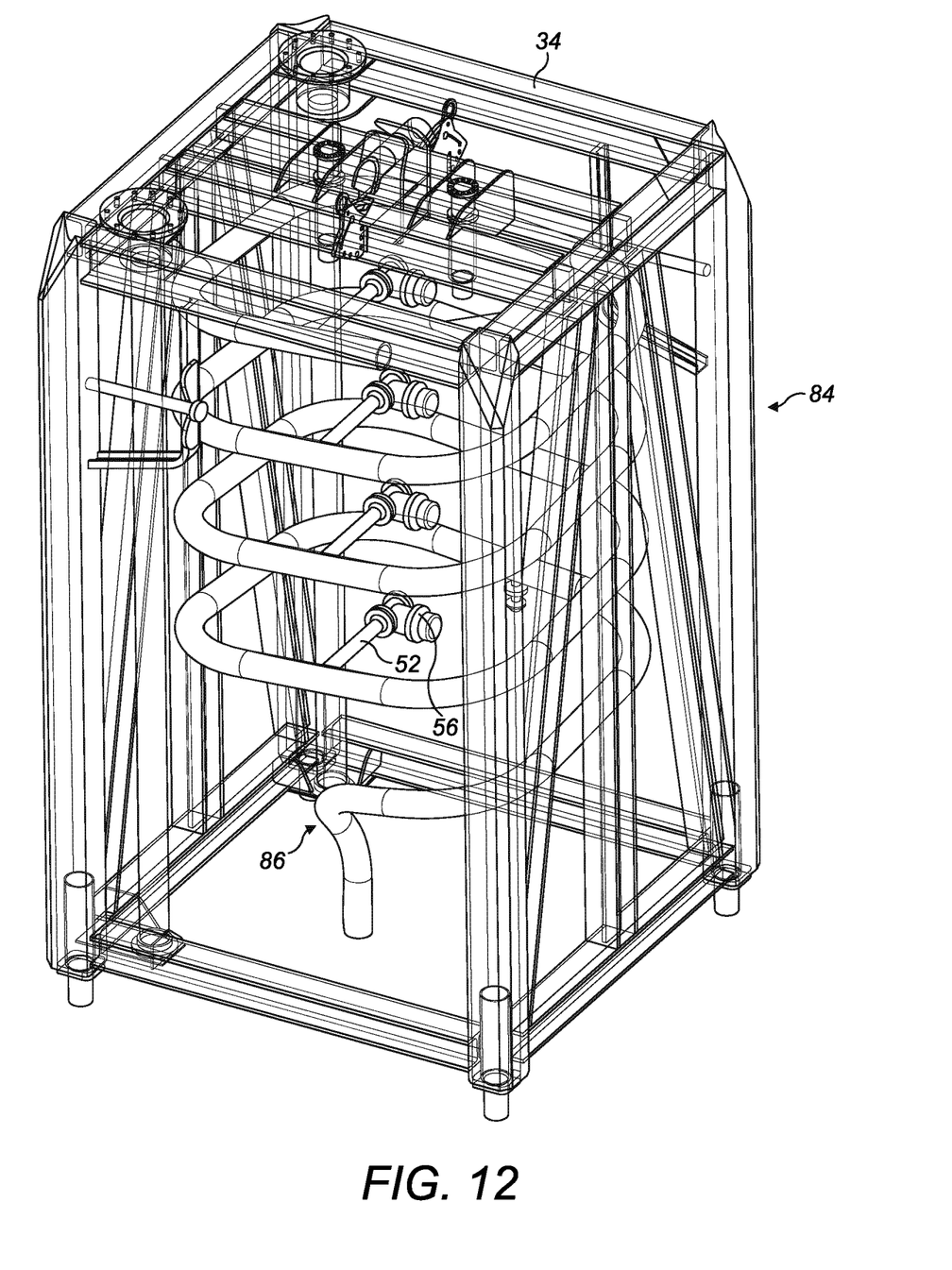
FIG. 12 is a perspective view of an alternative pig launcher, being a variant having a loop shape like that shown in FIG. 7.
Figure 13:
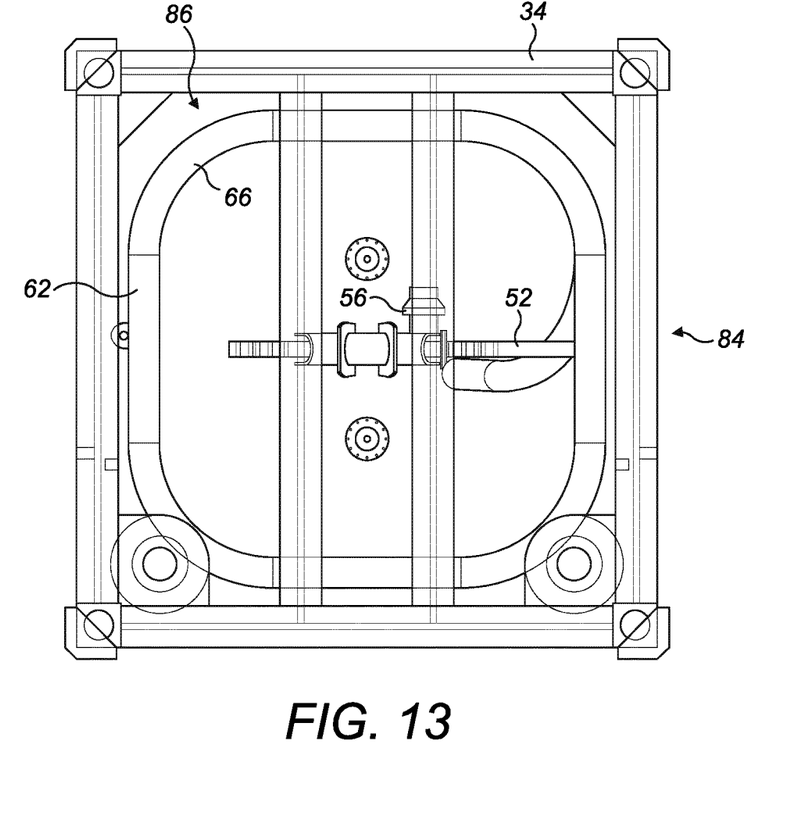
FIG. 13 is a top plan view of the variant shown in FIG. 12.

The generally square loop shown in FIG. 7 is also shown in FIGS. 12 and 13, to be described below.

Figure 8:
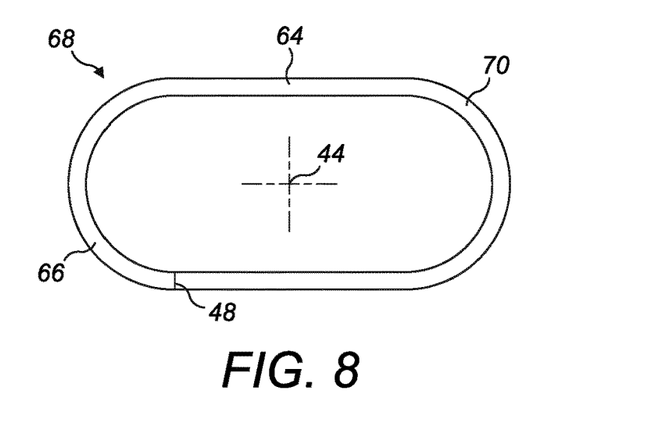
Figure 9:
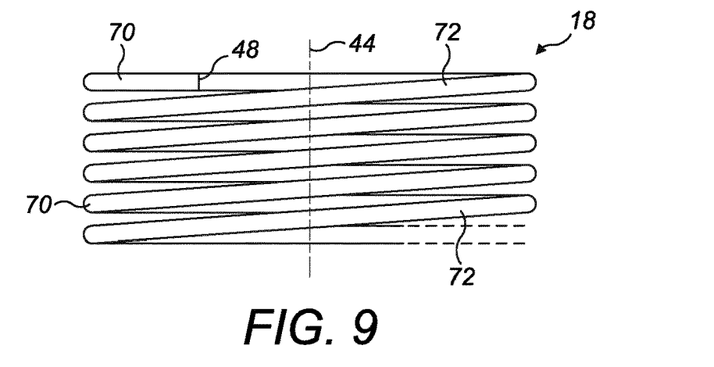
FIG. 9 is a schematic side view of a stack of loops shaped as shown in FIG. 8.

Turning next to FIGS. 8 and 9, these drawings show another loop configuration for a magazine 68 in which a loop 70 has two straight parallel portions 64 joined at their ends by semi-circular portions constituting 180° bends 66. Thus, the loop 70 in these drawings may be regarded as an elongate rectangle or oblong with opposed minor sides that are curved.

The side view of the magazine 68 in FIG. 9 shows that the loops 70 are stacked mostly in respective parallel planes that are substantially orthogonal to the central longitudinal axis 44. A ramp portion 72 of each loop 70 joins each layer of the stack to the next layer or loop 70 beneath.

Figure 10:
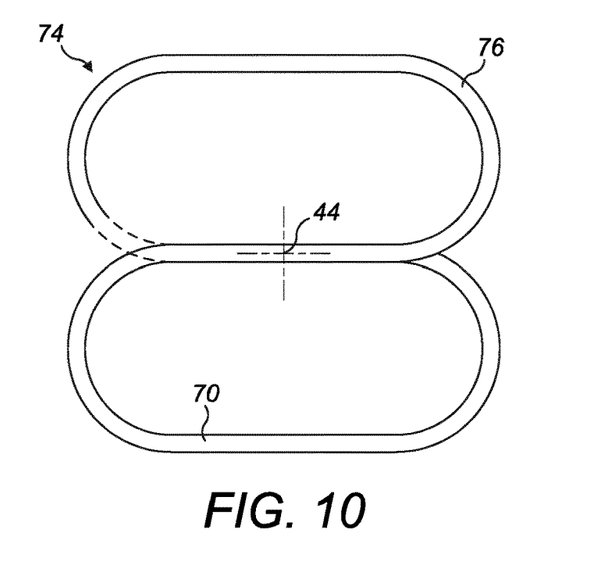
FIG. 10 is a schematic plan view of a further variant showing loops disposed beside each other in a layer.

The magazine 74 illustrated in FIG. 10 shows that an elongate loop 70 like that shown in FIG. 8, or of another shape, may communicate with one or more adjacent external loops 76 on the same level, for example in a numeral-8 configuration as shown. It will be apparent that in this case, the overall plan shape of this numeral-8 configuration approximates to a square. This may be beneficial for packaging the magazine 74 within the plan envelope of a cuboidal subsea module.

Figure 11:
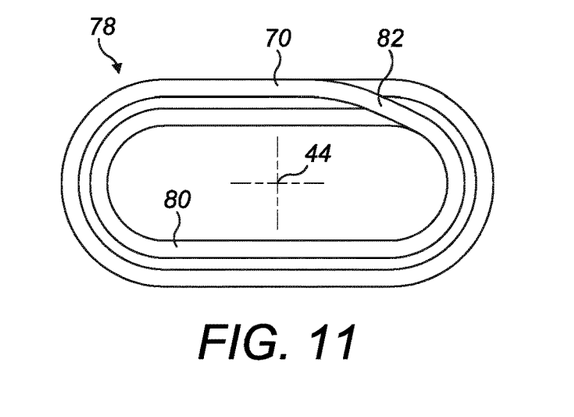
FIG. 11 is a schematic plan view of a further variant showing one loop nested within another loop in a layer.

The magazine 78 illustrated in FIG. 11 shows that a loop 70 like that shown in FIG. 8, or of another shape, may communicate with one or more adjacent internal loops 80 on the same level, in a nested spiral arrangement. The inner and outer loops 80, 70 shown here are joined by a gently-curved connecting tube 82.

Again, loop configurations like those shown in FIGS. 10 and 11 may repeat as a layered arrangement extending longitudinally along the central longitudinal axis 44, like the helix shown in FIGS. 2 to 4 or the stack shown in FIG. 9.

Finally, FIGS. 12 and 13 show a module 84 containing an alternative pig launcher 86 that has a helical succession of generally square-shaped loops like that shown schematically in FIG. 7. Otherwise, like numerals are used for like parts. It will be apparent how the straight portions 64 alternating with bends 66 maximise the length of the tubular magazine that can be accommodated within the cuboidal confines of the module 84. This is achieved by orienting the straight portions 64 to lie substantially parallel to side faces of the module 84 as defined by the frame 34.

With a worst-case pigging frequency of every second day, amounting to approximately 180 pigs per year, two helical magazines 42 containing 100 pigs each would last for twelve to fourteen months between refills if used in parallel as shown in FIG. 2. This assumes that the magazines 42 contain pigs with a diameter of 12" (305 mm) and with a length of 1.5 times their diameter. With smaller-diameter and hence shorter pigs—for example, with diameters of 10" (254 mm) or 8" (203 mm)—the number of pigs that can be stored in a magazine and so can be launched before refilling a pig launcher can be increased.

The invention claimed is:

1. A subsea pig launcher, comprising:
   a tubular magazine for holding a plurality of pipeline pigs in longitudinal succession ready for launching successively into a subsea pipeline,
   wherein the magazine is shaped to define a succession of full, intercommunicating loops that extend around an upright axis, the loops being stacked or layered along the upright axis.

2. The pig launcher of claim 1, wherein the successive loops have substantially the same size or shape as each other.

3. The pig launcher of claim 2, wherein the successive loops of the magazine define a generally helical arrangement of successive coils.

4. The pig launcher of claim 1, wherein a substantially cylindrical lumen extends along the upright axis within the succession of loops.

5. The pig launcher of claim 1, wherein a launch system is housed within the succession of loops, the launch system communicating with the magazine to launch the pigs.

6. The pig launcher of claim 5, wherein the launch system comprises a plurality of kick lines each communicating with a respective loop.

7. The pig launcher of claim 6, wherein the kick lines are pressurised by a common line extending within and along the succession of loops.

8. The pig launcher of claim 1, wherein the magazine is shaped to define an inner turn within an outer turn.

9. The pig launcher of claim 8, wherein the inner and outer turns are, respectively, part of inner and outer intercommunicating loops.

10. The pig launcher of claim 1, wherein successive turns of the intercommunicating loops are in mutually-opposed directions.

11. The pig launcher of claim 10, wherein the directions are clockwise and anticlockwise with respect to the upright axis.

12. The pig launcher of claim 10, wherein the magazine is shaped to define intercommunicating loops that lie beside each other in a plane intersecting the upright axis.

13. The pig launcher of claim 1, comprising an exit tube that extends downwardly from a lower end of the magazine.

14. The pig launcher of claim 1, wherein at least one turn of the intercommunicating loops is curved along its length continuously with a substantially constant radius of curvature.

15. The pig launcher of claim 1, wherein at least one turn of the intercommunicating loops is curved along its length with a variable radius of curvature.

16. The pig launcher of claim 1, wherein at least one turn of the intercommunicating loops has a discontinuous curvature.

17. The pig launcher of claim 16, wherein the at least one turn has at least one substantially straight section and at least one bend.

18. The pig launcher of claim 17, wherein, in top plan view, the magazine has substantially polygonal shape.

19. The pig launcher of claim 18, wherein the polygonal shape is rectangular, hexagonal, or octagonal.

20. The pig launcher of claim 1, wherein the radius of curvature of any section of a turn is greater than three times the diameter of a tube defining the magazine.

21. A subsea-connectable module, comprising: a frame; and
   the pig launcher of claim 1 supported in the frame.

22. The subsea-connectable module pig launcher of claim 21, wherein the frame is substantially cuboidal.

23. The subsea-connectable module of claim 22, wherein a substantially straight section of the magazine lies substantially parallel to a face of the cuboidal frame.

24. The subsea-connectable module of claim 22, wherein the magazine has a substantially polygonal or part-polygonal shape in plan view and at least one side of the polygonal or part-polygonal shape lies substantially parallel to a face of the cuboidal frame.

25. The subsea-connectable module of claim 21, wherein the frame has a height greater than its width.

26. The subsea-connectable module of claim 21, wherein the frame comprises at least one upright guide formation.

27. The subsea-connectable module of claim 26, wherein the at least one guide formation extends in a direction substantially parallel to the upright axis.

28. A method of launching pipeline pigs subsea the method comprising:
- providing the pig launcher of claim 1;
- providing a series of pigs stored in longitudinal succession along a path that is curved in plan view around an upright axis; and
- advancing at least one of the series of pigs along the path with angular movement at least 720° around the upright axis.

29. The method of claim 28, comprising conveying launch pressure to the pigs from an inner side of the curve of the path.

30. The method of claim 28, comprising moving a modular structure that supports the pigs in a direction of movement substantially parallel to the upright axis during installation and removal operations.

* * * * *